United States Patent [19]

Kuzin et al.

[11] 4,099,334
[45] Jul. 11, 1978

[54] DIP ANGLE DATA TRANSMITTER

[76] Inventors: Eduard Nikolaevich Kuzin, ulitsa 3 Internatsionala, 74, kv. 199; Mikhail Leibovich Fainzilber, Budapeshtskaya ulitsa, 17, korpus 5, kv. 62; Nadezhda Borisovna Ivanova, ulitsa Dimitrova, 10, korpus 1, kv. 220; Jury Stepanovich Kozlov, ulitsa Dimitrova, 10, korpus 1, kv. 160; Vladimir Fedorovich Korelin, ulitsa Belgradskaya, 20, kv. 123; Nikolai Vasilievich Dmitrievsky, Piskarevsky prospekt, 10, kv. 289, all of Leningrad; Savaty Solomonovich Schedrovitsky, 13 Parkovaya ulitsa, 25, korpus 1, kv. 12, Moscow; Vitaly Iosifovich Berkman, ulitsa Shvernika, 12/2, korpus 2, kv. 57, Moscow; Anatoly Borisovich Syrkov, Pogonny proezd, 25, kv. 62, Moscow, all of U.S.S.R.

[21] Appl. No.: 658,715

[22] Filed: Feb. 17, 1976

[51] Int. Cl.² ............... G01C 9/08; G01C 9/06; G01C 9/12
[52] U.S. Cl. ........................ 33/346; 33/366; 33/396
[58] Field of Search ............ 33/343, 346, 366, 391, 33/396

[56] References Cited

U.S. PATENT DOCUMENTS

| 277,842 | 5/1883 | Ketchledge et al. | 33/391 |
| 1,793,404 | 2/1931 | Johnson | 33/391 |
| 1,814,976 | 7/1931 | Stromer | 33/391 |
| 2,372,091 | 3/1945 | Land | 33/346 |
| 2,952,920 | 9/1960 | Cloud | 33/396 |
| 3,059,343 | 10/1962 | Kermode | 33/391 |
| 4,034,481 | 7/1977 | Stoltz | 33/396 |

FOREIGN PATENT DOCUMENTS

| 20,056 of | 1897 | United Kingdom | 33/346 |

Primary Examiner—Richard E. Aegerter
Assistant Examiner—Richard R. Stearns
Attorney, Agent, or Firm—Lackenbach, Lilling & Siegel

[57] ABSTRACT

A dip angle data transmitter wherein a laminated pendulum, housed in a viscous fluid completely filling a casing, is arranged in the latter so that the distance between the surfaces of the pendulum's plates and the inner surface of the casing is found from the following formula:

$$x > \frac{v\omega}{g},$$

wherein $\chi$ is the distance between the surfaces of the pendulum plates and the inner surface of the casing for the given two points;

$v$ is the kinematic viscosity of the viscous fluid at a minimum working temperature;

$\omega$ is the natural frequency of the transmitter oscillations; and $g$ is the gravity acceleration.

4 Claims, 9 Drawing Figures

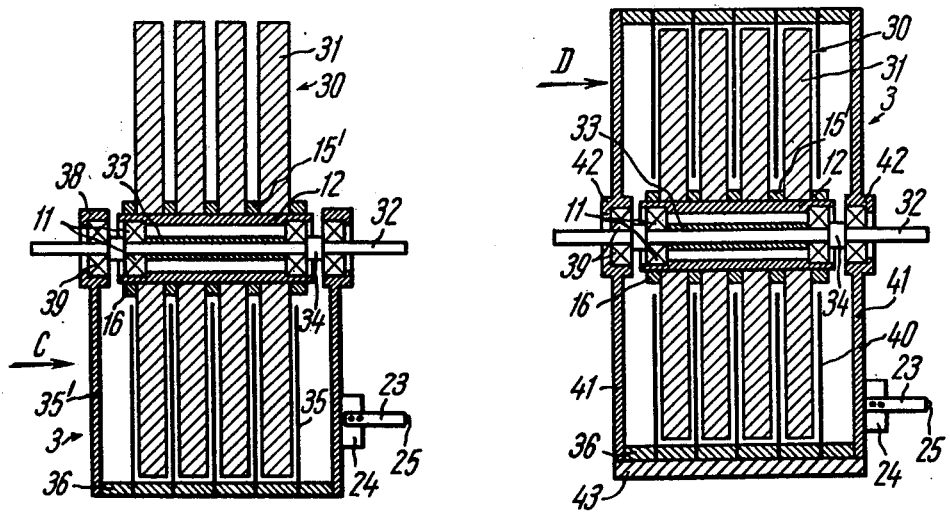
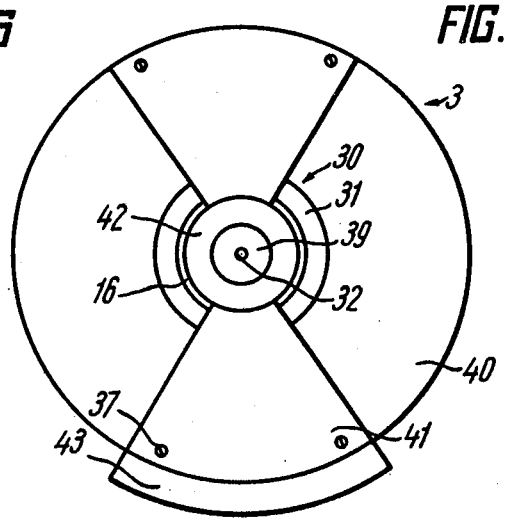

DIP ANGLE DATA TRANSMITTER

The present invention relates to measuring instruments, and more specifically, to dip angle data transmitters.

The dip angle data transmitter serves to measure the angles of inclination of machine elements with regard to the horizon and the conversion of the measured value into a physical one, e.g. into an electrical value suitable for further use. It may be utilized in building, earth moving, farm and other machines which need vertical orientation of their working members. The described instrument relates to pendulum-type transmitters with fluid damping of the pendulum by viscous friction forces.

A majority of instruments of this type are damped by viscous friction forces being in proportion to the relative speed of movement (turn) of the pendulum (the speed relative to the instrument body). This method of damping is inefficient since it gives rise to the discrepancy between interference protection (interference-horizontal inertial acceleration affecting the pendulum in the plane of its oscillations) of the transmitter and dynamic properties thereof along the channel of a useful signal (the transmitter dip angle). Similar transmitters are widely used in industry. They comprise a casing housing viscous fluid, and a pendulum being damped by viscous friction forces. To create these forces provision is made for narrow gaps between the pendulum and the casing (or the elements connected thereto), wherethrough the pendulum forces the fluid while moving (turning) relative to the casing. This provides for the damping effect, since the damping force depends upon the speed of the fluid flowing through the narrow gaps, and the speed of flowing is in direct proportion to the speed of the pendulum displacement with respect to the casing (the pendulum relative speed). The above prior-art transmitters possess the disadvantages which are absent in the transmitters whose pendulums are damped by the forces with the prevalence of viscous friction being in direct proportion to the speed of movement (turning) of the pendulum relative to the immovable system of coordinates (the pendulum absolute speed). This imaginable system of coordinates can be mentally connected to any immovable (or actually slightly-movable) body being incorporated in the transmitter's structure. And the damping effect is provided by the viscous friction forces developed between the pendulum and said body (or between the elements being connected to them).

The transmitter using such principle of operation is provided with a heavy inertial body arranged on the axis and balanced with regard to said axis. Therefore, when the transmitter is inclined or when there is action of inertial accelerations said inertial body can be regarded as actually motionless. The pendulum damping is effected by special structural member consisting of concentric rings. The latter are connected to the pendulum and the inertial body and have sufficiently small concentric gaps between each other which accommodate viscous fluid effecting viscous friction between the rings i.e. between the pendulum and the inertial body.

A disadvantage of such a structure is the presence of a special structural member effecting viscous friction which complicates the structure and the manufacturing of a transmitter in view of the difficulty of making sufficiently small concentric gaps. Besides, this leads to a necessity of providing the viscous friction member with movable packings preventing the removal of viscous fluid from the concentric gaps. And open packings of a labyrinth type poorly protect the fluid from evaporation, and closed ones - ensuring a proper seal-develop a strongly pronounced dry friction which substantially decreases the accuracy of the transmitter and its dynamic properties.

Another disadvantage consists in the necessity of using a specially manufactured heavy body of inertia. Firstly, this itself complicates the structure and the manufacturing of a transmitter. Secondly, this gives rise to the loading of the rotary parts' supports (the pendulum and the body of inertia) of the transmitter either with a considerable weight of the body of inertia, or with the weight of this body together with the pendulum which increases the forces of dry friction in the supports and entails a negative result mentioned hereinabove.

The object of the present invention is to provide a dip angle-data transmitter, simple in structure to facilitate its manufacture and servicing.

A further object of the invention is to provide a dip angle-data transmitter possessing higher dynamic properties along the channel of a useful signal with a maximum high interference protection.

Said objects are attained by that in the dip angle data transmitter whose casing accommodates viscous fluid and housing the body of inertia and the pendulum and the shaft of rotation of the latter has an axis arranged in the casing the pendulum is damped by the viscous friction forces proportional to the speed of its rotation relative to the body of inertia. The pendulum, according to the invention, is made laminated and being placed in the casing so that the distance between the surfaces of the pendulum's plates and the inner surface of the casing is found from the following formula:

$$x > \frac{\nu \omega}{g},$$

where $\chi$ is the distance between the surfaces of the pendulum's plates and the inner surface of the casing for the two given points; $\nu$ is the kinematic viscosity of the viscous fluid at a minimum working temperature;

$\omega$ is the natural frequency of the transmitter's oscillations, and $g$ is the gravity acceleration, the viscous fluid proper serving as a body of inertia.

To secure simplicity of the structure with a sufficient value of the viscous friction forces it is expedient for the pendulum's plates to have a circular or sector form and to be fastened on the pendulum's axis at a preset distance from and parallel to each other.

To ensure a damping effect with small-size structures provision is made in the transmitter's structure for a possibility of using an additional body of inertia in the form of discs fastened on the pendulum's axis between its plates and arranged parallel to the latter.

Such embodiment of the dip angle data transmitter essentially simplifies its structure, makes the production less expensive, facilitates the servicing and improves reliability. Besides, due to the decrease of dry friction affecting the transmitter's movable parts, and the friction between said parts and the casing there is ensured a higher accuracy of the measurement of angles in dynamic conditions and those of static equilibrium.

The invention will now be described with reference to a specific embodiment thereof and appended drawings, wherein:

FIG. 6 is a cross-sectional view of another variant embodiment of the transmitter's pendulum according to the Invention;

FIG. 8 is a cross sectional view of still another variant of the embodiment of the transmitter's pendulum in accordance with the Invention;

FIG. 9 is a view of the pendulum along D in FIG. 8.

Figure 1:
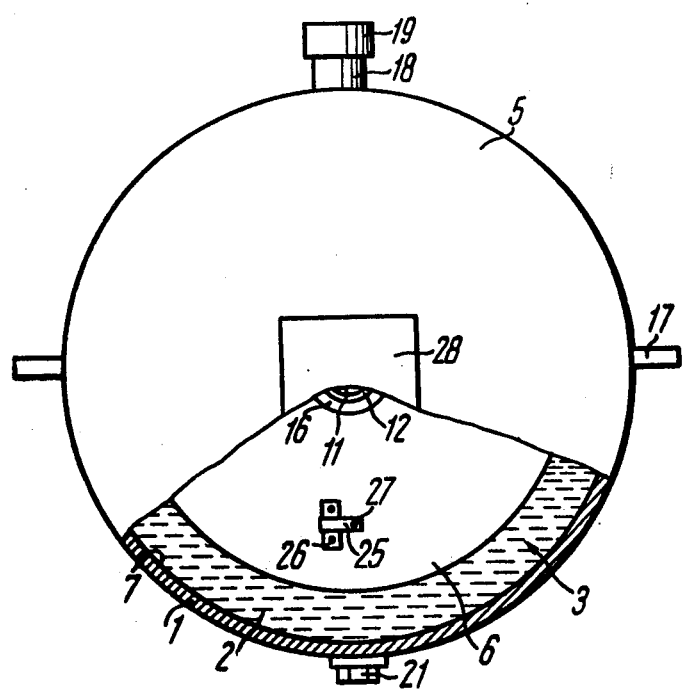
FIG. 1 is a side elevational view of a dip angle data transmitter in accordance with the invention, partially-cut from the side of the casing lid.

The dip angle data transmitter, according to the invention, comprises a casing 1 (FIG. 1) filled with viscous fluid 2, in the described example with mineral oil, whose viscosity is selected depending upon a preset range of working temperatures. Instead o mineral oil there can be employed other viscous fluids ensuring the damping necessary to meet temperature conditions.

The viscous fluid 2 serves as a body of inertia in the described example.

Arranged in the casing 1 is a laminated pendulum 3 whose axis 4 (FIG. 2) is secured in the casing 1 and its lid 5, said pendulum being damped by viscous friction forces proportional to the speed of its movement relative to the fluid 2.

The laminated pendulum 3 is positioned in the casing 1 so that the distance between the surfaces of its plates 6 and the inner surface 7 of the casing 1 (or inner surface 8 of lid 5 of casing 1) is determined from the following formula:

$$x > \frac{\nu \omega}{g},$$

where $\chi$ is the distance between the surfaces of the given plate 6 of the pendulum 3 and the inner surface 7 of the casing 1 (or to the inner surface 8 of the lid 5);

$\nu$ is the kinematic viscosity of the viscous fluid 2 at a minimum working temperature;

$\omega$ is the natural frequency of the transmitter's oscillations, and $g$ is the gravity acceleration.

If we measure the value of $\nu$ in stokes, value $\omega$ in l/sec, value $g$ in cm/sec$^2$, then value $\chi$ is expressed in cm.

While the embodiment of the transmitter's structure is in keeping with this requirement of the value $\chi$, there are developed such conditions, during its operation, under which the fluid 2 filling the casing 1 is actually not involved in the movement either by the casing 1, or the pendulum 3 of the transmitter. Therefore, it can be considered motionless, while the damping forces created by the viscous friction between the pendulum 3 and the fluid 2 can be regarded proportional to its absolute (relative to the motionless fluid) speed of movement. This provides a high level of dynamic properties mentioned hereinabove.

In a specific example the value $\chi$ is determined in the following manner.

Let the transmitter operate at the lowest ambient temperature of the air being $-10°$ C and let mineral oil with a 1000 stoke viscosity at this temperature be employed for damping. Suppose that the transmitter's natural frequency at this viscosity equals 0.5 l/sec. Let's take the gravity acceleration as approximately equalling $g \approx 980$ cm/sec$^2$.

Then, the value $\chi$ is determined by the relation:

$$X > \left( \frac{1000.05}{980} \right) \text{cm},$$

or $\chi > 0.51$ cm.

If the transmitter is to operate within a wide temperature range, then, in view of the necessity to stabilize its dynamic properties a more viscous fluid is to be employed in the zone of high temperatures. The fluid's viscosity at working temperatures should not be higher than that at which the value $\chi$ was determined. Under the conditions of the example in point this maximum permissible viscosity is 1000 stokes.

Figure 3:
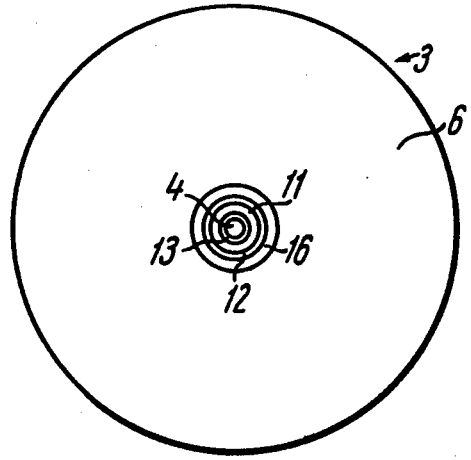
FIG. 3 is a side elevational view of the transmitter's pendulum according to FIGS. 1 and 2, as viewed along A in FIG. 2.
Figure 2:
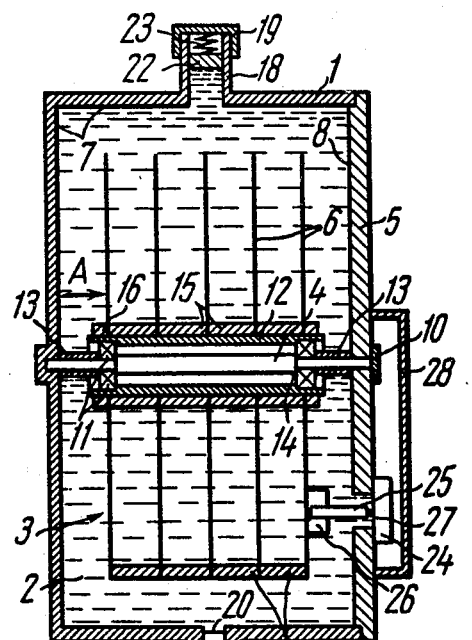
FIG. 2 is a longitudinal cross-sectional view of the dip angle data transmitter shown in FIG. 1.

Plates 6 (FIG. 3) of the pendulum 3 in the described Example are round in hape and are secured at a preset distance from and parallel to one another, as is shown in FIG. 2. Secured on the peripheral arc of the plates 6 is an out-of-balance body 9.

The axis 4 of the pendulum 3, as has already been said above, is secured in the casing 1 and lid 5 of said casing 1 with the aid of a support strip 10 protecting the axis 4 against axial displacement. Fit on the axis 4 on bearings 11 is a bushing 12. The bearings 11 are kept from axial displacement along the axis 4 with the help of bushings 13 and stepped projections 14 of the axis 4. The bushing 12 is provided with a train of bushings 15 ensuring a preset distance between the plates 6 of the pendulum 2 and simultaneously serving to fasten these plates. End face plates 6 of the pendulum 3 are secured with the aid of fastening rings 16.

On the casing 1 (FIG. 1) of the transmitter provision is made for supports 17 for setting up the transmitter at an object the dip angle of which is measured, and for a neck 18 for pouring the viscous fluid 2 and controlling the latter's level, said neck being closed by a cap 19, as well as for an aperture 20 (FIG. 2) for discharging the viscous fluid 2 which is closed by a plug 21.

To make up for thermal expansion of the viscous fluid 2 provision is made in the casing 1 for a compensating device of one of the known types, e.g. membrane, sulphon or a piston device (the latter is shown as an example in FIG. 2, where 22 is the piston, and 23 is its spring). Instead of a compensating device a breather can be arranged in the neck for pouring the viscous fluid, provided there is free surface in said neck.

In accordance with the invention, the angle of rotation of the pendulum 3 with regard to the casing 1 serves as the output value of the transmitter. To convert this angle into a certain physical value suitable for further use there is provided a transmitter converter.

Shown in FIG. 2 as an example is a potentiometer-type electrical converter. The latter incorporates a potentiometer 24 immovably secured on lid 5 of the casing 1 of the transmitter, and a spring-slider 25 secured on an electric insulator 26 immovably mounted on one of the end face plates 6. A contact 27 of the slider 25 moves along the winding (not shown in the drawing) of the potentiometer 24. The slider 25 and the potentiometer 24 are connected into an electrical circuit ensuring the power supply for the converter and the removal of an output signal from the latter. Various prior art types of electrical circuits may be provided, e.g. a bridge. To make the potentiometer 24 airtight it is closed with lid 28.

Figure 4:
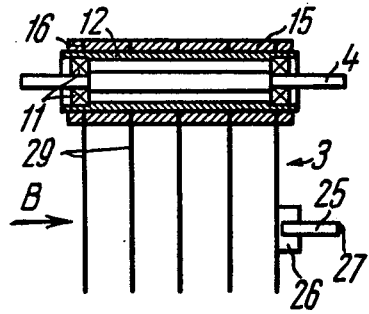
FIG. 4 is a cross sectional view of one variant embodiment of the dip angle data transmitter's pendulum in accordance with the Invention.
Figure 5:
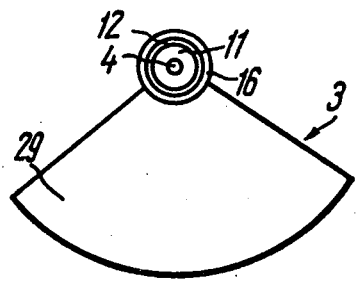
FIG. 5 is a view of the pendulum along B in FIG. 4.

In another embodiment of the dip angle data transmitter, in accordance with the Invention, employed for transmitters with high natural frequency, the plates 29 (FIG. 4) of the pendulum 3 are sector-shaped, as is shown in FIG. 5, and are secured on the axis 4 (FIG. 4) of the pendulum 3 at a preset distance from and parallel to one another, as it has been described in detail hereinabove.

The following variant of the embodiment of the transmitter according to the Invention can well be employed for small-size dip angle data transmitters.

Figure 7:
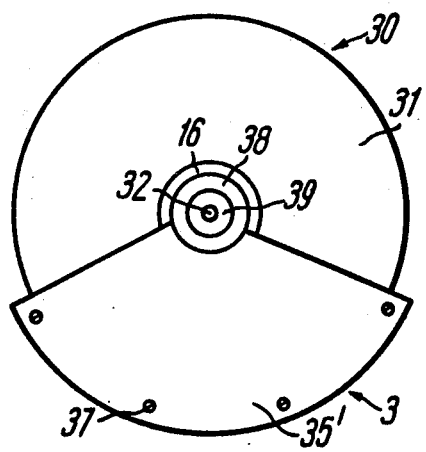
FIG. 7 is a view along C in FIG. 6, showing an additional body of inertia and the pendulum as in FIG. 6.

In this case provision is made in the transmitter for an additional body of inertia 30 (FIG. 6). The latter is made in the form of discs 31 (FIG. 7) fit upon the bushing 12 (FIG. 6) along with bushings 15' and fastening rings 16. The bushing 12 is arranged on the axis 32 of the pendulum on the bearings 11 with a bushing 33 being positioned between the latter. Fit upon the axis 32 from the outer side of the bearings 11 are bushings 34. The discs 31 are disposed between the plates 35 of the pendulum 33 and are parallel to aid plates. The plates 35 of the pendulum 3 are sector-shaped as is shown in FIG. 7. Said plates are interconnected with the aid of washers 36 (FIG. 6) and screws 37 (FIG. 7). The end face plates 35' of the pendulum 3 are provided with bushings 38 (FIG. 6) in their central part, with which said plates are fit, with the aid of bearings 39, upon the axis 32 of the pendulum 3. The axis 32 is mounted in the transmitters casing (not shown in the drawing) in the manner similar to that shown hereinabove in FIG. 2 in the case of the axis 4.

In still another embodiment of the dip angle data transmitter, according to the invention, which should be used with a lower natural frequency of the transmitter and its smaller dimensions, the plates 40 (FIG. 8) of the pendulum 3 are circular as is shown in FIG. 9. Said plates are connected to each other with the aid of washers 36 (FIG. 8) and side strips 41 provided with bushings 42 in their central part. Said bushings are fit upon the axis 32 of the pendulum 3 with the help of bearings 39. Screws 37 (FIG. 9) serve to connect the side strips 41, washers 36 and the plates 40 of the pendulum 3. Arranged between the plates 40 (FIG. 8) are the discs 31 of the additional solid body of inertia 30. Said discs are secured on the axis 32 of the pendulum 3, the axis 32 being secured in the casing (not shown in the drawing) in the same manner as has been shown above (FIG. 6) out-of-balance body 43 of the pendulum 3 is secured to washers 36 (FIG. 8).

The principle of operation of the proposed dip angle data transmitter will now be described by the examples of its static equilibrium and the dynamic transient process for the transmitter according to FIG. 1 (the principle of operation of the other embodiment variants in analogous).

A. The Static Equilibrium Position.

The casing 1 (FIG. 1) of the dip angle data transmitter is rigidly connected by the supports 17 with that element of a machine the dip angle of which is measured with respect to the horizon. This dip angle is a useful signal. When the casing 1 is inclined to a certain angle $\alpha$ in the plane of oscillations of the pendulum 3, the latter retains constant orientation relative to the geodesic vertical with the result that the pendulum 3 and the casing 1 of the dip angle data transmitter rotate with respect to each other around the axis 4 to angle $\beta$ being equal to angle $\alpha$ ($\beta = \alpha$).

At the same time a contact 27 (FIG. 2) of the spring slider 25 has moved along the surface of the potentiometer 24 with the result that an electric signal will enter the measuring diagram, said signal being proportional to angle $\alpha$. With that the static measurement of the casing 1 dip angle and the conversion of the value measured into an electrical form is brought to an end.

B. Dynamic Transient Processes.

In transient processes the pendulum 3 (FIG. 1) may not retain its orientation with respect to the vertical. This will lead to that angle $\beta$ of the pendulum 3 rotation relative to the casing 1 will not always be equal to dip angle $\alpha$ of the latter in relation to the horizon. Yet, this difference is insignificant, taking into account the method of damping and determining the value $\chi$ provided for by the present Invention.

A positive feature of the proposed transmitter is its contributory dynamic responses along the channel of a useful signal (the casing dip angle). These responses are determined by the following average data for the already realized structures.

Attenuation of the amplitude-frequency response which is the strongest at the transmitter's natural frequency constitutes 0.1 to 0.2 of the static deviation. 100% transmission is actually ensured throughout the remainder of the frequency band.

A phase shift provided by the transmitter in the frequencies lower than the natural one is negative and does not exceed 15°–20°. In higher frequencies the phase shift is positive.

These responses point to minor dynamic errors and make it possible to regard the dip-angle data transmitter, according to the Invention, an almost ideal dynamic link.

When the transmitter is affected by an interference in the form of a horizontal acceleration in the plane of the pendulum's oscillation, which may occur both in the static and dynamic conditions of measuring angle $\alpha$, the latter, under the action of inertial acceleration, deviates further from the vertical (the interference channel) which brings about an error in measuring angle $\alpha$ because of the interference.

In the proposed structure of the dip angle data transmitter this error is insignificant which ensures a high-interference-protection of the transmitter. Said interference-protection is characterized by an amplitude-frequency response according to the interference channel. This response, by the example of the prior-art structures of the dip angle data transmitter, according to the invention, is either monotonically attenuating, or has a slightly-pronounced resonance (about 1.1 to 1.3 static deviation at a given acceleration) for the natural frequency. This permits employing the transmitter on mobile machines moving at great speeds at a high level of interference.

What is claimed is:

1. A dip angle measuring device, comprising:
a casing having an inner surface;

viscous fluid completely filling said casing and serving as a first body of inertia of the device;

a laminated pendulum provided in the form of separate substantially parallel, spaced part circular plates rotatably mounted on a shaft for rotation about a common axis, said pendulum being arranged in said viscous fluid, and said shaft of said pendulum being disposed in said casing; said pendulum being damped primarily by forces of viscous friction acting on said plates, the spacing of said plates and the viscosity of said fluid being such that said forces are proportional to the speed of the pendulum rotation relative to said first body of inertia;

a converter of the angle of rotation of said pendulum relative to said casing into a physical value useful for providing an indication of the dip angle, said converter being carried by said pendulum and said casing;

means arranged in said casing for making up for thermal expansion of said viscous fluid within an anticipated working range of temperatures for said transmitter; and a second body of inertia in the form of discs carried by said shaft of said pendulum between the plates thereof and arranged parallel to said plates.

2. A dip angle measuring device according to claim 1, wherein said pendulum is arranged in said casing so that the distance between the surfaces of the plates thereof and said inner surface of said casing is found from the formula:

$$x > \frac{\nu\omega}{g},$$

where
  $\chi$ is the distance between the surfaces of said plates of said pendulum and said inner surface of said casing for the two given points,
  $\nu$ is the kinematic viscosity of said viscous fluid at a minimum working temperature,
  $\omega$ is the natural frequency of oscillations of said transmitter, and $g$ is the gravity acceleration.

3. A dip angle measuring device, comprising:

a casing having an inner surface;

viscous fluid completely filling said casing and serving as a first body of inertia of the device;

a laminated pendulum provided in the form of separate substantially parallel, spaced part sector-shaped plates rotatably mounted on a shaft for rotation about a common axis, said pendulum being arranged in said viscous fluid, and said shaft of said pendulum being disposed in said casing; said pendulum being damped primarily by forces of viscous friction acting on said plates, the spacing of said plates and the viscosity of said fluid being such that said forces are proportional to the speed of the pendulum rotation relative to said first body of inertia;

a converter of the angle of rotation of said pendulum relative to said casing into a physical value useful for providing an indication of the dip angle, said converter being carried by said pendulum and said casing; and means arranged in said casing for making up for thermal expansion of said viscous fluid within an anticipated working range of temperatures for said transmitter; and a second body of inertia in the form of discs carred by said shaft of said pendulum between the plates thereof and arranged parallel to said plates.

4. A dip angle measuring device according to claim 3, wherein said pendulum is arranged in said casing so that the distance between the surfaces of the plates thereof and said inner surface of said casing is found from the formula:

$$x > \frac{\nu\omega}{g},$$

where
  $\chi$ is the distance between the surfaces of said plates of said pendulum and said inner surface of said casing for the two given points,
  $\nu$ is the kinematic viscosity of said viscous fluid at a minimum working temperature,
  $\omega$ is the natural frequency of oscillations of said transmitter, and $g$ is the gravity acceleration.

* * * * *